Figure 1:
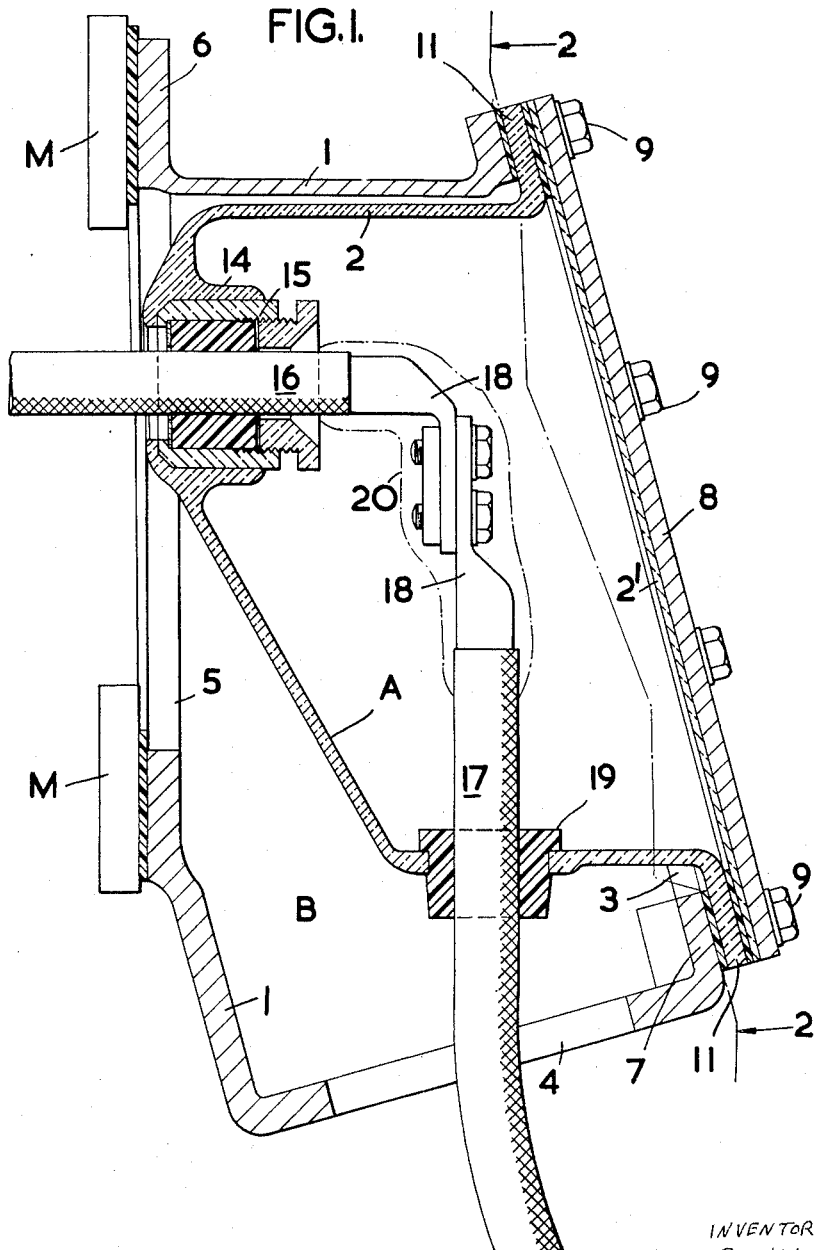

United States Patent Office 3,153,695
Patented Oct. 20, 1964

3,153,695
TERMINAL BOXES FOR ELECTRICAL APPARATUS WITH EXPLOSION PROTECTIVE LINING
Walter Hill, Stretford, Manchester, and Harry Woodward, Whitefield, Manchester, England, assignors to Associated Electrical Industries Limited, London, England, a British company
Filed Jan. 16, 1961, Ser. No. 83,040
Claims priority, application Great Britain Jan. 28, 1960
9 Claims. (Cl. 174—52)

This invention relates to terminal boxes for electrical apparatus, such as dynamo electric machines, and in particular to a terminal box for a motor operating on a system having a high fault capacity of the order of, say, 150 mva.

When motors are used on systems of high power potential certain problems arise associated with the terminal box of the motor. For example, if an electric fault occurs in the box or is referred into the box from the motor, an enormous amount of energy is dissipated virtually instantaneously, and there is difficulty in containing this energy. Clearly if it is released in any form it will be a danger to personnel who are in the vicinity.

The problem has hitherto been tackled from three particular aspects; (1) by increasing the strength of the box; (2) by reducing the likelihood of a fault occurring in the box or being referred into the box; and (3) by providing a mechanical "fuse" to release the energy in a selected direction.

With regard to the first approach, cast iron boxes which are liable to shatter have been replaced by fabricated steel boxes, but flame originating in the box can still cut through the steel, allowing dangerous hot gas and flame to emerge.

Among typical precautions taken in the second approach, the size of the cables was increased so that a fault in the motor would not fuse them, the terminals were mounted on a bar of insulating material instead of on a metal bar bound with mica, and all other such moisture traps were eliminated as far as possible.

The provision of a mechanical fuse, such as a frangible panel of resinous insulating material, has been considered as a third approach, but although the panel could be so positioned that the fragments due to explosion would be directed in a selected direction, they would still be liable to cause injury, though this might not be lethal. The panel can be arranged for instance to explode downwards, but the resulting hot gas and flame are still dangerous.

Terminal boxes of the kind being considered are normally 3-phase, and any fault between one phase and earth immediately develops into a fault between lines by virtue of the gases released. Although interphase shields to prevent direct flashover have been employed, they do not prevent further flashover once an arc has been establish between one phase and earth.

The improved terminal box according to this invention comprises a metal casing having a rear wall adapted to be secured to electrical apparatus and provided with an opening for the passage of a cable therethrough, a front wall having an access opening, a cover-plate removably secured to the access opening, a bottom wall provided with a second cable opening, and a lining of rigid insulating material mounted within the casing, the lining having cable openings adjacent to those in the casing, an access opening conforming to that of the casing and a lid of insulating material held against the access opening by the cover-plate. Advantageously the casing is of welded steel construction and the lining is a pressed or moulded box of glass fibre with appropriate bushes or glands of insulating material for the passage of cables.

For use with multi-phase apparatus the terminal box may comprise a single casing with transverse partitions or walls which divide the interior into separate compartments, one per phase, each compartment being provided with a box-like lining of insulating material provided with separate cable passages and cover-plate. In this form the separate compartments are intended to prevent a fault between one phase and earth from developing into an interline fault, and the insulating enclosure for each terminal within its individual compartment is to reduce the likelihood of a fault occurring between the phase and earth.

Figure 2:
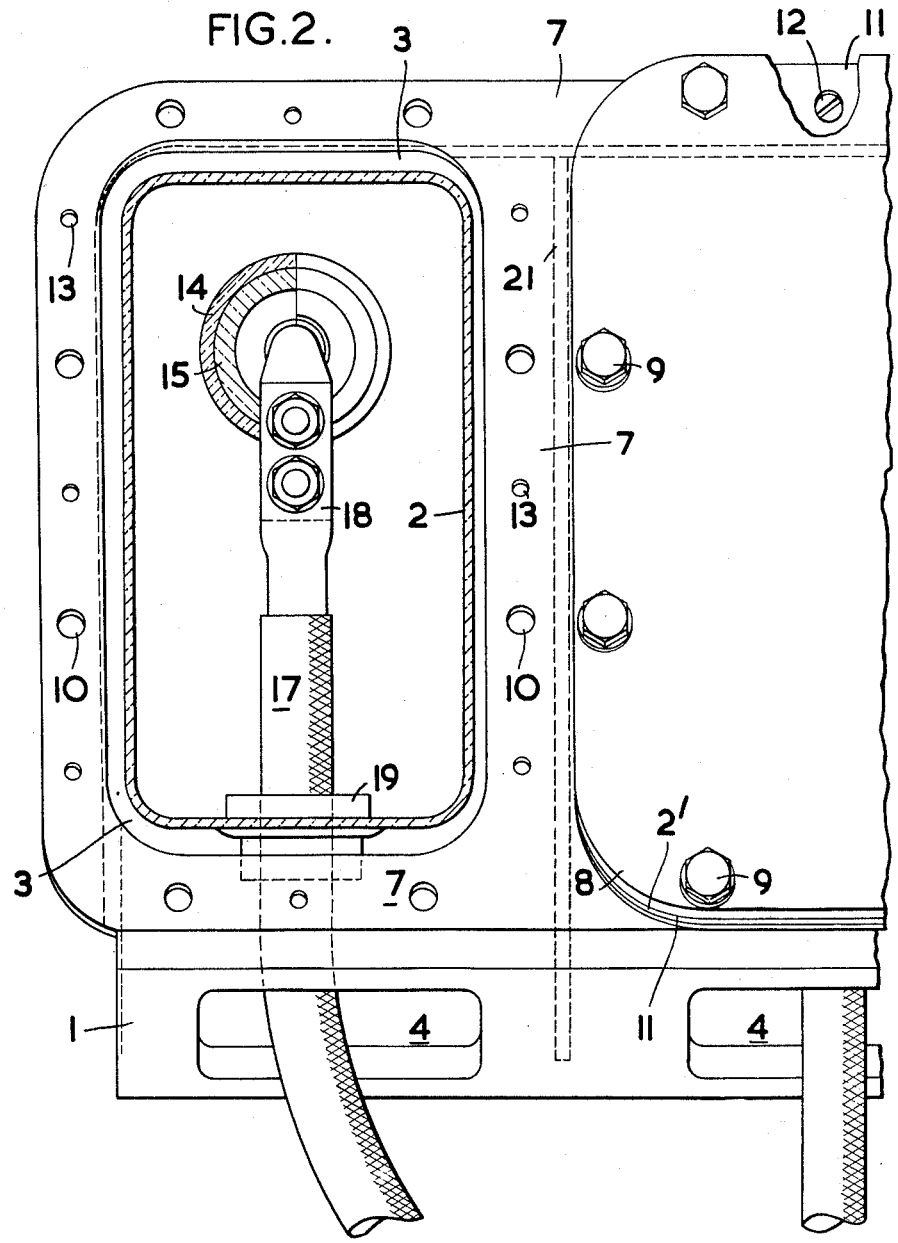
Figure 3:
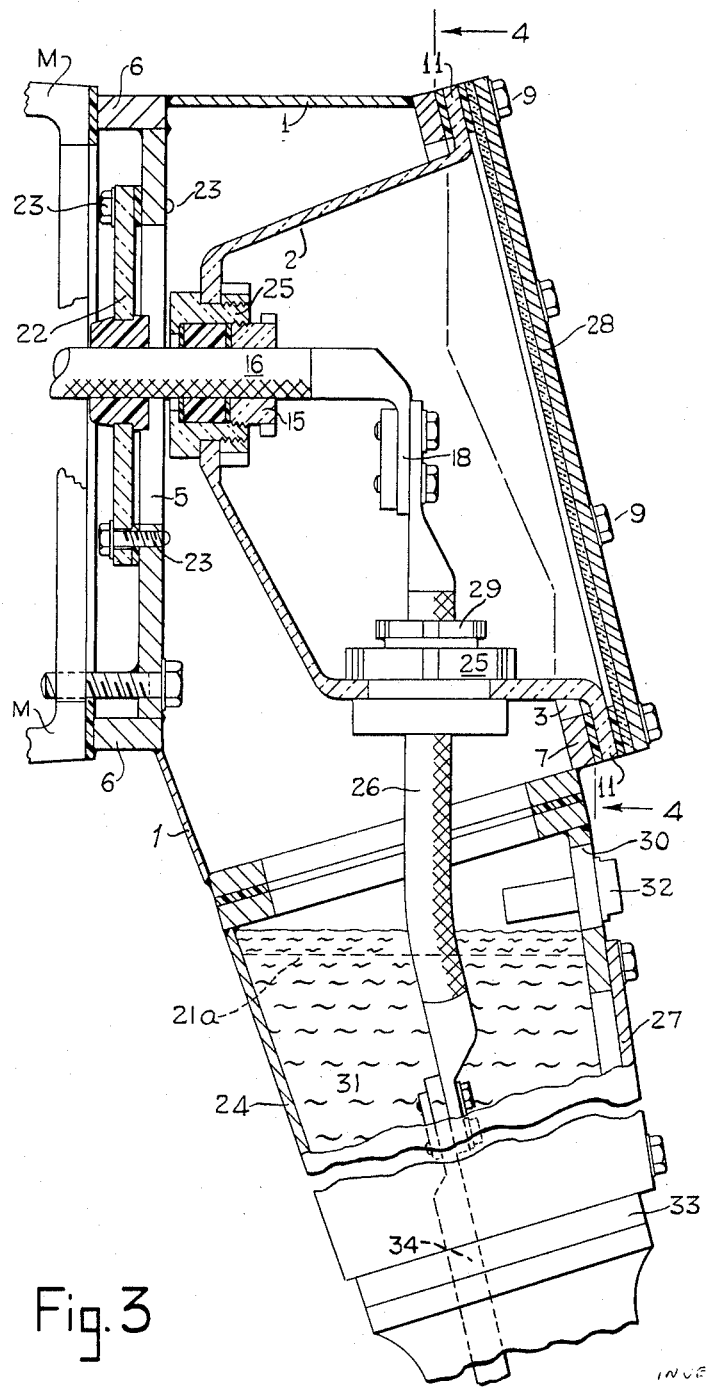
Figure 4:
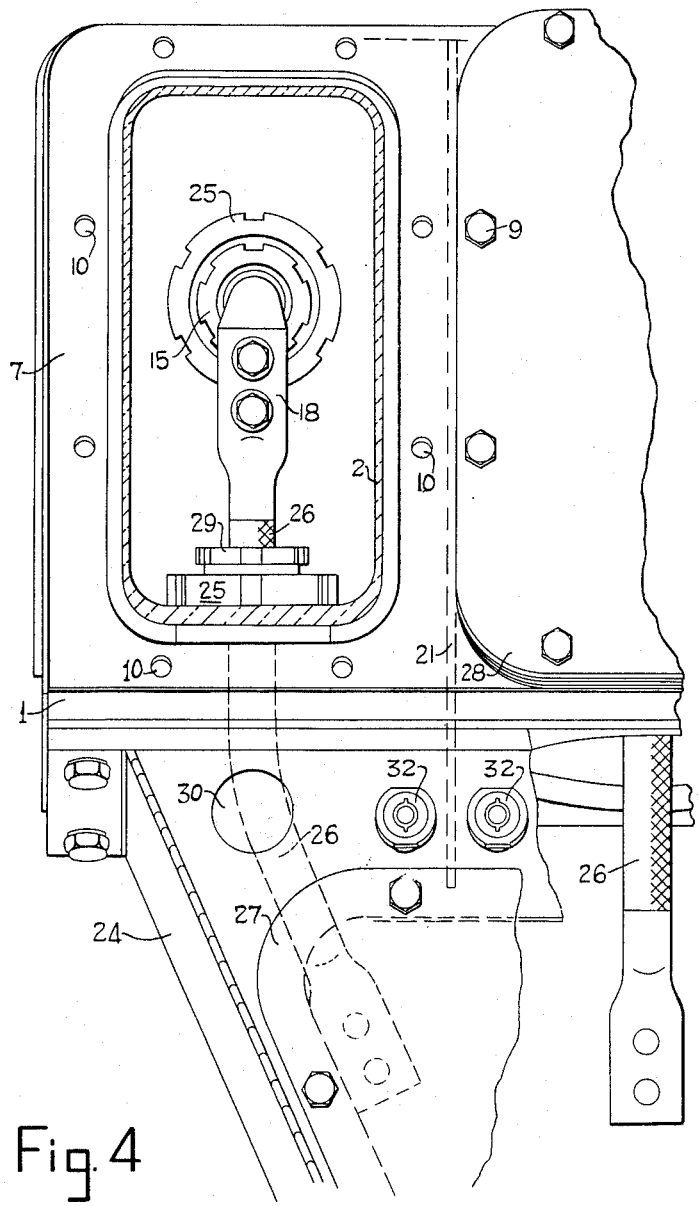

Two embodiments of the invention are illustrated in and will now be described referring to the accompanying drawings in which:

FIG. 1 is a sectional side elevation through a cable compartment, and FIG. 2 is a front elevation of a multi-phase box divided into compartments, the left hand compartment being viewed on the line 2—2 of FIG. 1 to show the interior. FIGS. 3 and 4 are similar views showing a modified construction, like references indicating corresponding parts.

The box illustrated comprises a welded steel casing 1 with a box-like lining 2 of glass fibre supported therein. The casing has a front access opening 3, a bottom opening 4 and a rear opening 5, and is adapted for mounting an electrical apparatus (such as a motor represented by the members M) as by a rear flange 6. The front of the box consists of a flat plate 7 with one or more openings 3 each closed by a cover-plate 8 secured by bolts 9 screwed into holes 10 in the plate 7. The plate 8 has a lining 2' of fibre glass sheet: alternatively a separate fibre glass lid may be fitted to the box 2.

The lining 2 comprises a box made in one piece by moulding or pressing glass fibre, and has a front opening surrounded by a flange 11 by which it is held in position on the front plate 7 as by screws 12 (FIG. 2) screwed into holes 13 in the plate. Suitable gaskets are positioned between the parts 7, 11 and 2'. The upper part of the rear face of the lining 2 is formed with a hollow boss 14 directed towards the opening 5; boss 14 contains a gland or bushing 15 for supporting a cable 16 from the motor or other apparatus. This cable is connected to a second cable 17 by terminal clamps 18 and passes through a bush 19 in the bottom wall of lining 2 and out through opening 4 in box 1. The cable clamps are enclosed by insulating tape represented by the dotted line 20 (FIG. 1). Below the boss 14 the rear wall of the lining slopes forward as indicated at A towards the front to provide an expansion space B in the lower part of casing 1.

When the box 1 is required for multi-phase use it is divided into a number of compartments, one for each phase, by transverse partitions 21 as shown in FIG. 2; each compartment contains a lining 2 as previously described having for convenience, its own cover-plate 8 and lining such as 2'. In a preferred construction the partitions 21 are steel plates welded to the inside of the casing. It will be seen that each terminal is thus contained in a compartment separated from the adjacent compartment by a steel partition and, furthermore, each compartment is provided with a lining of insulating material on all sides which supports the terminals.

Preferably the largest unsupported plane of glass fibre is on the side facing the motor, and if as in some instances the aperture 5 between the terminal box and the motor can be left open, or closed by a simple insulation plate, any explosion within the glass fibre box 2 will tend to expand into the motor. Even if, as in some other applications, the terminal box is isolated from the motor by a steel plate, the initial leaking of the glass fibre wall, indicated at A in FIGURE 1, can provide an expansion space B within the terminal box casing, if the metal compartment in that region is made larger than the glass fibre box as shown in the drawing. This will contain the explosion for an instant and help to reduce its external effect.

As an alternative to taping, the whole of the internal space can be filled by a non-hardening plastic substance, as for instance silicone elastomer putty.

Another embodiment would be a terminal box with the features described above but otherwise constructed on conventional lines to meet flameproof regulations, for use in situations where such regulations apply.

In the modification shown in FIGS. 3 and 4 the casing 1 is built up of steel plates welded together and the cover 28 is a steel plate with a lining made of the same material (e.g. fibre glass) as the lining 2.

The bush 19 has been replaced by a screw gland 29 (e.g. of nylon) similar to the gland 15. These glands are held in position in holes in the lining 2 by insulating nuts and washers 25.

The opening 5 at the rear of casing 1 is obstructed by a sheet 22 of frangible material secured by screws 23. The thickness of this sheet is determined by the permissible pressure which gases arising in the casing 1 may attain in the event of break-down of the lining 2.

Mounted on the lower end of casing 1 is a distribution box 24 of conventional design which receives the supply cable (not shown) which is connected to the terminals 18 by short interconnectors 26 which may be flexible or rigid conductors. Box 24 has the usual opening with a cover plate 27 and one or more filling openings 30 for the admission of sealing compound 31. If desired humidity indicators and desiccators (for example of the silica gel type) may be provided as shown by element 32. In this construction the phase separating partitions 21 are carried through the bottom of casing 1 so that they extend into the sealing compound 31. In FIG. 3 the bottom edge of a partition is indicated at 21a; this greatly improves inter-phase insulation between compartments of a multi-phase box. At the lower end of distribution box 24 a gland 33 of conventional type is provided for receiving a multi-core supply cable 34 the separate cores of which are joined individually to an interconnector 26 for each phase below the level of compound 31, and thereby the phases are completely sealed from each other by the partitions 21 and the sealing compound.

What we claim is:

1. A terminal box for high power electrical apparatus, comprising a metal casing having a rear wall adapted for securing to the apparatus, an opening in said wall for the passage of an electric cable therethrough, a front wall provided with an access opening, a bottom wall provided with a second cable opening, in combination with a lining of rigid insulating material mounted within said casing and defining an expansion space between said casing and said lining, said lining having cable glands facing the openings in said rear and bottom casing walls and an access opening conforming to that of said casing, and lid means for said box including insulating material rigidly backed by an outer cover plate and removably secured in a position to close both said access openings.

2. A terminal box in accordance with claim 1, in which said lid means comprises a sheet of insulating material which is held in position to cover the access opening by a rigid cover-plate which is bolted to said metal casing.

3. A terminal box in accordance with claim 2, in which said rear wall opening is closed by a frangible panel of insulating material through which the cable passes for connection to said electrical apparatus.

4. A terminal box for high power electrical apparatus, comprising a metal casing having a rear wall adapted for securing to the apparatus, an opening in said wall for the passage of an electric cable therethrough, a front wall provided with an access opening, a bottom wall provided with a second cable opening, in combination with a box composed of insulating material mounted within said casing to provide an insulating lining therefor, said box having a front opening surrounded by an outwardly directed flange which lies over a cooperating flange around said casing opening, means securing said flanges to each other for positioning said box within said casing, a rear wall on said box and a bottom wall on said box each provided with cable glands facing the casing openings, said rear box wall sloping forward from the gland on the rear box wall to the gland on the bottom box wall thereby to provide an expansion space in the lower part of said casing, and lid means comprising a metal cover plate insulated on its inner surface and removably secured to said outwardly directed flange to close said box opening.

5. A terminal box in accordance with claim 4, in which said rear casing wall opening is closed by a frangible panel of insulating material through which the cable passes from said cable gland on said rear box wall to said electrical apparatus.

6. A terminal box in accordance with claim 5, in which said lid means comprises an insulating cover held against said outwardly directed flange by a metal coverplate bolted to said casing.

7. A terminal box for multi-phase electrical apparatus comprising a metal casing having a rear wall adapted for securing to the apparatus, a front wall provided with an access opening, a bottom wall, and a number of transverse partitions sealed to the inside of the casing so as to divide said casing into a plurality of separate compartments, one for each phase, each compartment having a cable opening in the rear casing wall and the bottom casing wall, a lining of rigid insulating material in the form of a box having a front opening surrounded by an outwardly directed flange which lies over a cooperating flange on the casing, means for securing said flanges to each other for positioning said box within said compartment, a rear wall on said box and a bottom wall on said box each provided with cable glands facing the casing openings, said rear box wall sloping forward from the gland on the rear box wall to the gland on the bottom box wall thereby to provide an expansion space in the lower part of said casing, and lid means comprising a rigid cover plate having insulating material provided on its inner surface and removably secured to said outwardly directed flange to close said box opening.

8. A terminal box in accordance with claim 7, having a distribution box mounted on the lower end of the casing for receiving a multi-core supply cable, electrically conductive interconnectors between said cable cores and cables passing through the glands in the said rear box walls, and a filling of insulating sealing compound in said distribution box around the joints between said cores and interconnectors.

9. A terminal box in accordance with claim 8, in which transverse casing partitions sealed to the inside of said casing extend below the bottom of said casing into the sealing compound in said distribution box.

References Cited in the file of this patent
UNITED STATES PATENTS

| | | |
|---|---|---|
| 2,240,922 | Bissell | May 6, 1941 |
| 2,345,757 | Lester | Apr. 4, 1944 |

FOREIGN PATENTS

| | | |
|---|---|---|
| 58,771 | Denmark | June 16, 1941 |
| 182,432 | Austria | June 25, 1955 |